(12) United States Patent
Pavlidis et al.

(10) Patent No.: US 6,370,260 B1
(45) Date of Patent: Apr. 9, 2002

(54) NEAR-IR HUMAN DETECTOR

(75) Inventors: Ioannis Pavlidis, Minneapolis; Peter F. Symosek, Shoreview; Bernard S. Fritz, Eagan, all of MN (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/389,925

(22) Filed: Sep. 3, 1999

(51) Int. Cl.⁷ .................................................. G06K 9/00
(52) U.S. Cl. ...................................... 382/103; 348/169
(58) Field of Search ................................. 382/107, 103, 382/165; 250/338; 356/400; 358/335; 348/584, 586, 188, 169

(56) References Cited

U.S. PATENT DOCUMENTS

| 4,500,784 | A | | 2/1985 | Hacskaylo |
| 4,520,504 | A | | 5/1985 | Walker et al. |
| 5,013,917 | A | * | 5/1991 | Ulich ........................... 250/330 |
| 5,221,919 | A | | 6/1993 | Hermans |
| 5,703,367 | A | | 12/1997 | Hashimoto et al. |
| 5,900,942 | A | * | 5/1999 | Spiering ...................... 356/400 |
| 5,940,139 | A | * | 8/1999 | Smoot ......................... 348/584 |
| 6,002,505 | A | | 12/1999 | Kraenert et al. |

OTHER PUBLICATIONS

Fendt et al., "The neuroanatomical and neurochemical basis of conditioned fear," *Neurosci Biobehav Rev*, 23(5):743–60 (May, 1999).

Jacquez et al., "The spectral reflectance of human skin in the region 0.7–2.6 µm," *Technical Report*, 189, Army Medical Research Laboratory, Fort Knox (Apr., 1955).

Jordan et al., "Hierarchical Mixtures of Experts and the EM Algorithm," *Neural Computation*, 6, pp. 181–214 (1994).

Levin et al., "The energy expended in chewing gum," *New England Journal of Medicine*, 341(27):2100 (Dec., 1999).

Mendez, *The Master of Disguise*, William Morrow and Co., New York, N.Y.; cover page, title page, copyright page and table of contents only; 4 pages. (1999).

Moghaddam et al., "Probabilistic Visual Learning for Object Recognition," *IEEE Trans. Pattern Analysis and Machine Intelligence*, 19(7):696–710 (Jul., 1997).

Otsu, "A Threshold Selection Method from Gray–Level Histograms," *IEEE Trans. Systems, Man And Cybernetics*, 9:(1)62–65 (Jan., 1979).

Pavlidis et al., "Automatic passenger counting in the high occupancy vehicle (HOV) lanes" *Proceedings 1999 Annual Meeting of the Intelligent Transportation Society of America*, Washington, D.C. (Apr. 19–22, 1999).

Pavlidis et al., "A near–infrared fusion scheme for automatic detection of vehicle passengers," *Proceedings 1999 IEEE Workshop on Computer Vision Beyond the Visible Spectrum: Methods and Applications*, 41–48, Fort Collins, C.O. (Jun. 22, 1999).

(List continued on next page.)

*Primary Examiner*—Andrew W. Johns
*Assistant Examiner*—Abolfazl Tabatabai
(74) *Attorney, Agent, or Firm*—John G. Shudy, Jr.

(57) ABSTRACT

An infrared detector having two cameras for viewing a scene to detect humans. The cameras focus the scene on their respective pixel arrays. One array is designed with a filter to be sensitive to light from 0.8 to 1.4 microns and the array of the other camera is designed with a filter to be sensitive from 1.4 microns to 2.2 microns. The arrays are co-registered spacially and temporally relative to the viewed scene and pixel transmission dynamics. The spectral powers of the pixels from both arrays are difference weighted and fused into one set of pixels. The fused pixels are thresholded into another set of pixels that have one of two values—black or white. These pixels are entered into a visual display that shows a segment image of a human if in the viewed scene.

37 Claims, 7 Drawing Sheets

OTHER PUBLICATIONS

Penev et al., "Local feature analysis: a general statistical theory for object representation," *Network: Computation in Neural Systems,* 7(3):477–500 (Aug., 1996).

Pentland et al., "Face recognition for smart environments," *IEEE Computer,* 33(2):50–55 (Feb., 2000).

Phillips et al., "The FERET database and evaluation procedure for face–recognition algorithms," *Image and Vision Computing,* 16(5):295–306 (Apr., 1998).

Prokoski "Disguise detection and identification using infrared imagery," *Proceedings of the SPIE, Optics, and Images in Law Enforcement II,* 339:27–31, A.S. Hecht, ed., Arlington, V.A. (May, 1982).

Sabins, *Remote Sensing, Principles and Interpretation,* W.H. Freeman and Company, New York, N.Y.; cover page, title page, copyright page and table of contents only; 7 pages. (1997, 3rd ed.).

Sliney, "Laser and LED eye hazards, safety standards," *Optics and Photonics News,* p. 32–(Sep., 1997).

Visionics Corporation, "Face detection constantly searches for faces in a datastream" Jersey City, N.J.; retrieved from the Internet on Jun. 25, 2001, <URL:http://www.visionics.com/faceit/tech/detect.html>, 1 page.

Wiskott et al., "Face recognition by elastic bunch graph matching," *IEEE Trans. Pattern Analysis and Machine Intelligence,* 19(7):775–779 (Jul., 1997).

Zhu et al., "Region Competition: Unifying Snakes, Region Growing, and Bayes/MDL for Multiband Image Sementation," IEEE Transactions on Image Analysis and Machine Intelligence, 18(9):884–900 (Sep., 1996).

\* cited by examiner

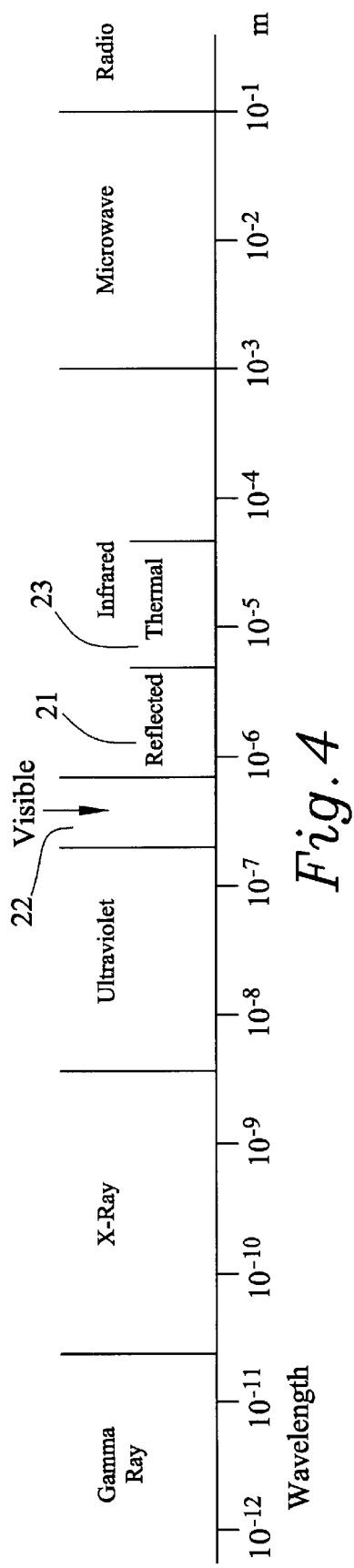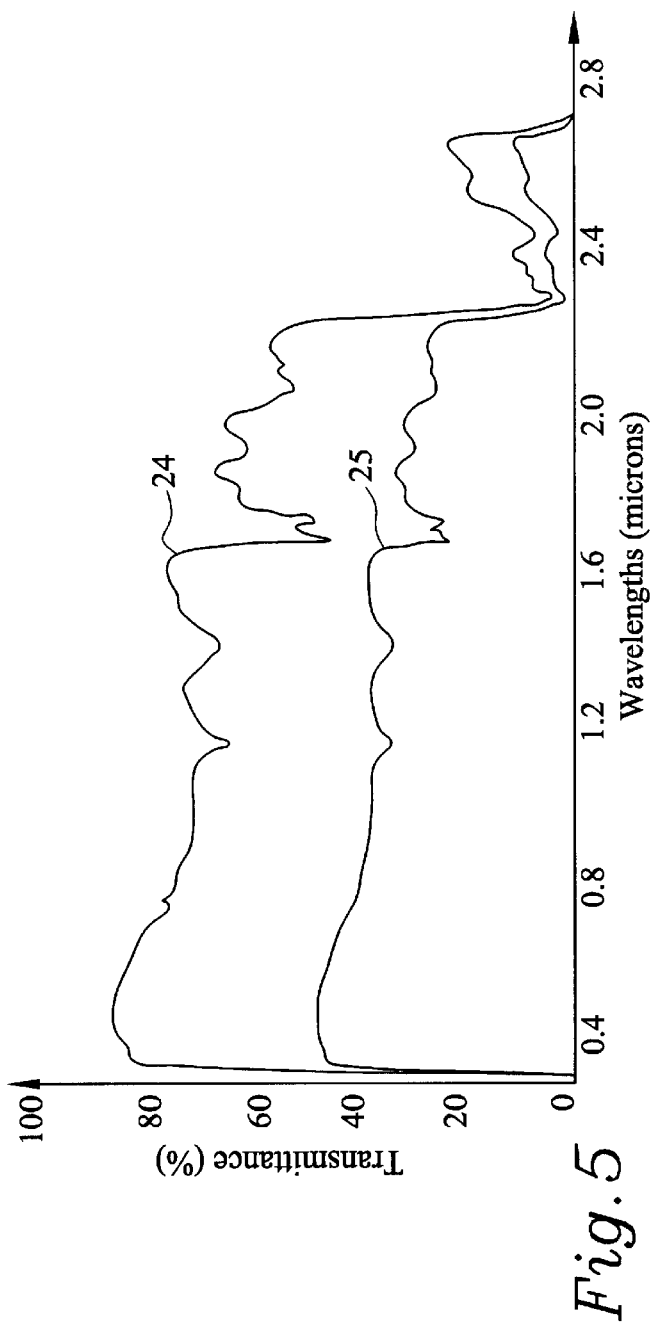

NEAR-IR HUMAN DETECTOR

BACKGROUND

The invention pertains to detection of people, and particularly to detection of occupants in vehicles. More particularly, it pertains to image fusion in the near-infrared band under various kinds of environmental conditions.

The gathering of usage statistics in the high occupancy vehicle (HOV) lane is desired by some government agencies. These statistics are crucial for construction planning. Currently, the gathering of data is performed manually. This approach is obviously laborious, inefficient, and prone to error.

There are compelling reasons for the existence of an automatic occupant counting system in the HOV lane. It would facilitate the gathering of statistical data for road construction planning. It would enable state authorities to charge a nominal fee to single occupant vehicles in HOV lanes. It would also help the state patrols to perform their monitoring tasks more effectively.

The occupant counting system needs to be reliable. In a sensing system, reliability is rarely achieved if the signal is corrupted with noise. The first concern in the present effort is to produce a signal with as distinct a signature for the vehicle occupant as possible. This goal can be achieved only through careful design and arrangement of the sensing elements.

If one manages to acquire a clear imaging signal through sensors, then even moderately powerful pattern recognition algorithms could accomplish the occupant detection task. If, however, the imaging signal were noisy, then even the most powerful pattern recognition algorithms could not accomplish the task.

Related efforts by others have involved the use of a near-infrared camera (0.55 to 0.90 micron) and a near-infrared illumination source in the same range of wavelengths. One reason for using near-infrared sensing was the ability to use non-distracting illumination at night. Illumination at nighttime enhances the quality of the image. However, it appears that the choice of range of wavelengths is not appropriate because of its close proximity to the visible spectrum. Psychophysical experiments have shown that the human eye has some sensitivity to this range of near-infrared wavelengths, however small. This sensitivity may be sufficient to potentially cause accidents under certain conditions. Another reason for this approach, according to others, was to bypass the problems caused by solar illumination during daytime, such as glare. Nevertheless, particularly in that range (i.e., 0.55 to 0.9 micron) solar illumination is still substantial and the associated glare can be reduced only through the use of polarizing filters.

In more general terms, related art projects that involve imaging usually adopt the use of visible spectrum cameras. The strong point of the visible spectrum approach is that the relevant imaging sensors are very advanced and at the same time the cheapest across the electromagnetic (EM) spectrum. Visible spectrum cameras have a particular advantage in terms of speed, which is an important consideration in the HOV lane where vehicles are moving at rates of speed of 65 mph. These cameras can also have very high resolution, resulting in very clear images under certain conditions. Unfortunately, there are serious problems with the visible spectrum approach. For instance, some vehicles have heavily tinted window glass to reduce glare from solar illumination. This glass is nearly opaque to visible spectrum cameras. Also, visible spectrum cameras do not have operational capability during nighttime.

Many researchers adopt the visible spectrum as the spectrum of choice, or, in rare cases, some other EM spectrum based primarily on intuition. The result is that they usually end up with a non-discriminating signal that makes the detection problem appear more difficult than it actually is. Then, they try to address the difficulty by devising powerful pattern recognition algorithms but often to no avail. The loss of information because of a poor sensor choice, spectrum, and arrangement is usually irrevocable.

Visible spectrum or very near infrared detection of people in vehicles has not been very successful under most conditions. The glare and other problems caused by solar illumination, such as through vehicle windows, has prevented effective detection of vehicle occupants. Also, environmental conditions like weather obscure detection. People appear to have darker or lighter faces, depending on the characteristics of the people being detected, and on the incident angle and intensity of deliberate or incidental illumination. Other wavelengths of the EM spectrum do not appear to offer inexpensive, compact, and high resolution sensing and detection of human beings in vehicles.

The lower portion of the EM spectrum consists of the gamma rays, the x-rays, and radiation in the ultra-violet range. Radiation of such wavelengths is harmful. This radiation is typically used in a controlled manner in medical applications.

At the far end of the EM spectrum, there is the microwave and radio radiation. This range was recently started to be exploited for imaging purposes. Sensors operate in an active or in passive mode. The major advantage of these longer wavelengths is that they can penetrate clouds, fog, and rain for producing weather-independent imaging results. The technology for these wavelengths is new, and prohibitively expensive. Also the sensors are bulky in this range of radiation, and feature very low resolution. A useful application of these sensors is currently confined to the military and the remote-sensing domain.

SUMMARY OF THE INVENTION

The present invention utilizes radiation in the middle region of the EM spectrum regarded as the infrared spectrum. This spectrum includes wavelengths from 0.7 to 100 microns. Within the infrared range, two bands of particular interest are the 0.7 to 3.0 micron, 3.0 to 5.0 micron and 8.0 to 14 micron bands. The latter two bands are regarded as the thermal infrared band and the first band as the reflected infrared band. The reflected infrared band is associated with reflected solar radiation that contains no information about the thermal properties of materials. This radiation is for the most part invisible to the human eye. The thermal infrared band, on the other hand, is associated with the thermal properties of materials.

The thermal infrared band is significant for several reasons. First, the human body maintains a relatively constant temperature of about 37 degrees Celsius (C), irrespective of physical characteristics or illumination conditions. This indicates a consistent light color pattern for the faces of vehicle occupants subject to thermal infrared imaging. This consistency is lacking in the visible spectrum. Such consistency facilitates interpreting sensed images. Further, the thermal property serves as a differentiator between humans and dummies. Also, a sensor functioning in the thermal region is operational day and night without any need for an external illumination source.

However, one concern is the attenuation of thermal infrared radiation caused by glass, when detecting humans in a vehicle. The glass severely disrupts the transmission of infrared radiation at wavelengths greater than 2.8 microns. At 2.8 microns, thermal energy just begins to appear. To obtain an infrared image under such conditions, one needs a very sensitive mid-infrared camera in the range from 2.0 to 3.0 microns. Vehicle windows are not made from common glass for reasons of safety, energy efficiency, and visibility. Also, the composition of the front windshield differs significantly from the composition of the side windows of a vehicle. The side windows are more transparent to the transmission of thermal infrared radiation. However, detection with a near-infrared camera significantly reduces this problem of radiation attenuation.

A near-infrared camera, if it is restricted to the appropriate range, outputs similar imaging signals for various humans despite their having different colors of skin. However, this camera outputs a much different imaging signal for a dummy having the same visible color as the human skin.

One embodiment of the present invention has two cameras of different sensing wavelengths in the near-infrared bandwidth. These cameras are pointed toward a place where humans may be detected. A near-infrared lamp for the illumination of the scene may be used. The two outputs of the cameras are fused together with a weighted difference to result in an image having an intensified contrast. The image output of the device that performs the fusion of the two camera images goes to a post-processor, which performs binary thresholding on the various pixels of the fused image. The result is an image with each pixel either being black or white. The thresholded output undergoes such operations as fuzzy neural network or analytical processing. The thresholded output diminishes all of the background of the viewed scene, except human skin such as faces. This approach is one embodiment of the human detector.

BRIEF DESCRIPTION OF THE DRAWING

FIG. 4 is the graph of the EM spectrum.

FIG. 5 reveals the infrared transmittance characteristics for an automobile windshield.

DESCRIPTION OF THE EMBODIMENT

Figure 1:
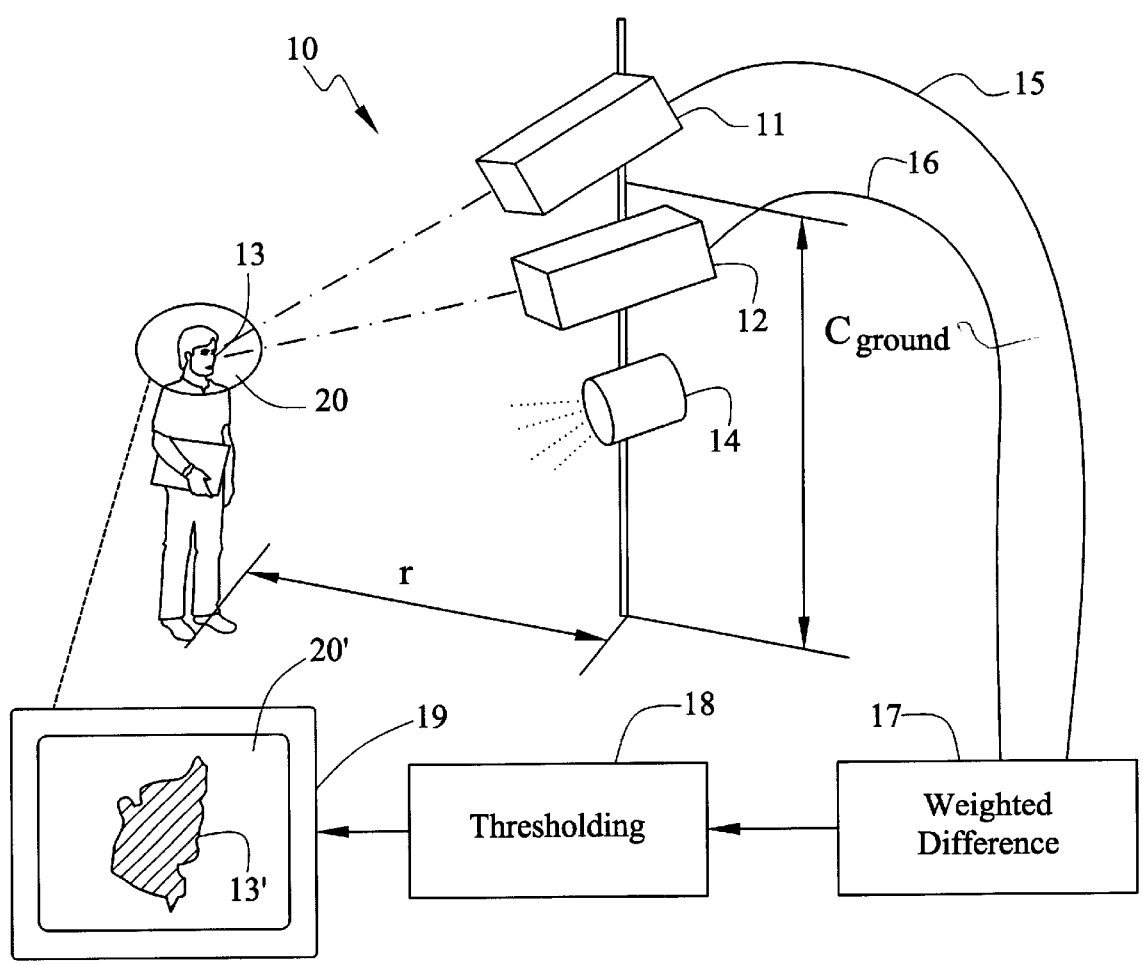
FIG. 1 shows a near-infrared fusion system for detecting humans.

FIG. 1 shows a basic layout of a near-infrared fusion system 10 for detecting humans. It is a dual-band imaging system. Two co-registered cameras 11 and 12 sense the image of, for instance, a face 13 of a human being. Camera 11 has a spectral sensitivity of 0.8 to 1.4 microns. Camera 12 has a spectral sensitivity of 1.4 to 2.2 microns. Slightly shorter or longer ranges can also yield acceptable detection results. The 1.4-micron threshold point between the two bands of spectral sensitivity is a preferable demarcation point for the dual-band system 10, but may be another value as appropriate. Each of the camera sensitivity band ranges can cross somewhat the 1.4 micron wavelength without diminishing the human detecting ability of system 10. The quality of the imaging signals from cameras 11 and 12 remain high even during overcast days and at nighttime, because the scene being scanned by cameras 11 and 12, can be illuminated with an eye-safe near-infrared illuminator 14. Since the eye is not sensitive to the near-infrared spectrum, system 10 can remain stealthy all of the time, whether in a detection mode or not. Ideally, the camera at the lower band range (0.8 to 1.4 microns) should be an image intensifier. Therefore, the illuminator's spectral emission specification needs to match only with the upper band range (1.4 to 2.2 microns). The upper band range is quite far from the visible spectrum and illumination in these wavelengths is safe even for highway applications. Near-infrared cameras 11 and 12 provide clear imaging signals even in foul weather conditions such as hazy conditions. These particular infrared bands of detection and illumination provide for sufficient light transmission through windshields, side windows, fog, and darkness. This permits adequate detection of humans in vehicles at night and in poor weather.

The image outputs 15 and 16 of cameras 11 and 12, respectively, go to a weighted difference software process 17 or specialized hardware that fuses the outputs by performing weighted subtraction of the intensities of the two camera images. This weighted difference software or hardware may be referred to as a fuser. Such fusion of the camera outputs intensifies the silhouette of face 13 and other exposed human skin in the resultant fused image. Also, the image features a diminution of the background of the scene being covered by the cameras. This increased contrast between the person and the background in the fused image permits essentially perfect image segmentation through thresholding by a software process 18, or specialized hardware. This thresholding software or hardware may be referred to as a thresholder. The output of the thresholder 18 may go to a display 19, printer, or a post-process or specialized hardware.

A final processed image shows the exposed skin parts, such as face 13, as binary blob 13', as shown in FIG. 1. Background 20 of sensed face 13 is discounted as shown by blank background 20' in display 19. This clean-cut binary imagery ensures reliable and fast operation of a pattern recognition algorithm that identifies a human as indicated by face 13' imagery.

Figure 2:
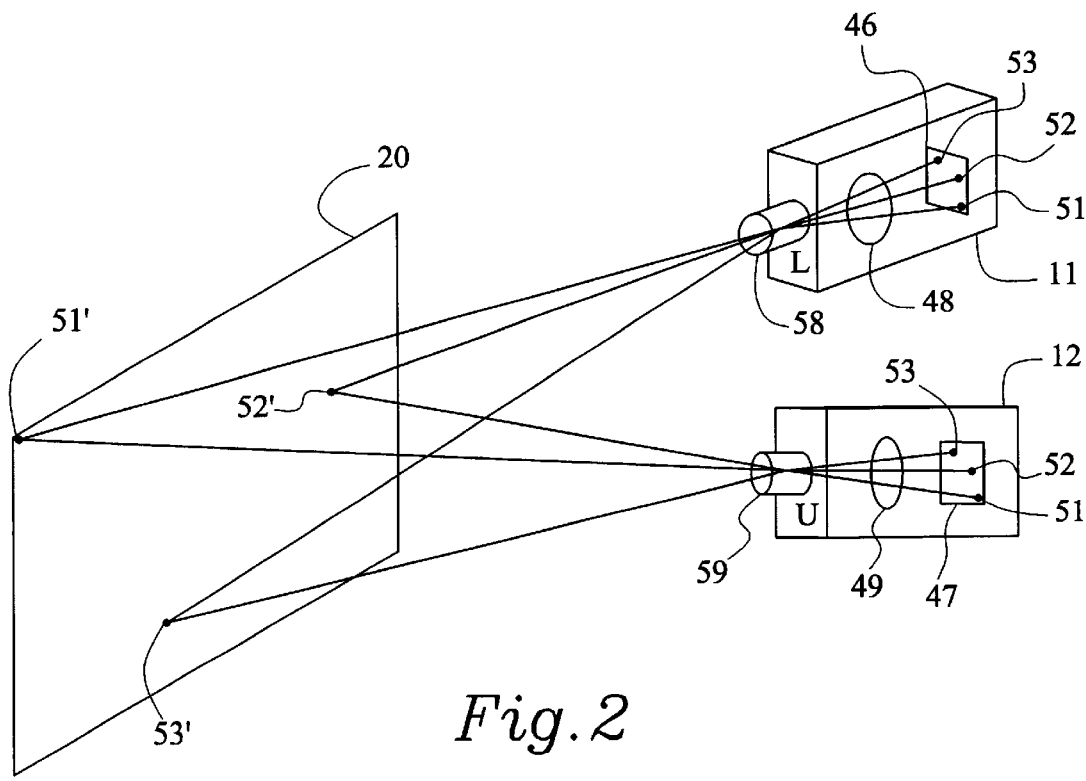
FIG. 2 illustrates a co-registration scheme for two cameras.

FIG. 2 illustrates the co-registration of cameras 11 and 12. There is spacial and time registration between the cameras. The cameras could be of the same make and model. The necessary difference between the cameras is the optical bandwidth filters, 48 and 49, which are situated between sensing arrays 46 and 47 and camera lens 58 and 59, respectively, of cameras 11 and 12. Filter 48 determines the 0.8 to 1.4 micron spectral sensitivity of array 46 in camera 11 and filter 49 determines the 1.4 to 2.2 micron spectral sensitivity of array 47 in camera 12. A polarizer may be inserted in front of lens 58 of camera 11 and in front of lens 59 of camera 12. Or instead, a polarizer may be inserted between lens 58 and array 46 of camera 11, and between lens 59 and array 47 of camera 12. Sensing arrays 46 and 47 of the cameras are the same size, for example, 512 by 512 pixels in a gallium arsenide substrate. Typically, the fields of view are the same for each array. Three pixels 51, 52, and 53, for example, are selected out for spacial co-registration. Each of the three pixels are focused on corresponding portions 51', 52', and 53', respectively, of image 20 viewed by cameras 11 and 12. That means the arrays have the same images, pixel for pixel, even though the spectral sensitivities are different. In other words, the columns and rows of pixels. are aligned with the physical world scene, pixel for pixel. Once spacially co-registered, cameras 11 and 12 are kept stationary relative to the physical world.

Time co-registration of the cameras means that the cameras are in synchronization with each other from a signal perspective. The signals for each of the two corresponding pixels go to a frame buffer at the same time. The retention of light for each pixel is in the micro-second range. A typical frame time is about 33 milliseconds, which is 30 frames per second. The transfer of pixel data may be parallel, line-by-line, or serial, pixel-by-pixel, or any other style of information transfer. There is a sync signal for cameras 11 and 12 to initiate and maintain their time co-registration.

The image outputs or pixel signals 15 and 16 go to a software process or specialized hardware 17 which provides a certain weighting to each of the pixels and fuses pairs of corresponding pixels from cameras 11 and 12, respectively, into single pixels. The weighted differencing is performed pixel by pixel. Each result is the fused pixel of the two weighted differenced pixels. The weight difference equation for such fusing is $$P(i,j)_{fused} = P(i,j)_{lower\ band} - C * P(i,j)_{upper\ band}.$$

P is spectral power. The position or location of each pixel in the respective image is identified by row (i.e., "i") and column (i.e., "j"). The rows and columns of pixels of the images of cameras 11 and 12 coincide with each other. The lower band pixels are these from camera 11 and the upper band pixels are those from camera 12. The spectral power "P" for each pixel at i,j is indicated by a numeral scale of brightness from 0 to 255. "0" is entirely black or dark (i.e., no spectral power) and "255" is entirely white or bright (i.e., full spectral power). Numerical indications in between 0 and 255 are, of course, representative of various gradations of gray, brightness, or spectral power. "C" of the equation is a constant (i.e., weighting factor), which is determined according to the lighting of background or scene 20 and object or face 13. "C" for daytime lighting conditions is about 3 for optimal results. "C" for nighttime depends upon the spectral distribution and properties of an artificial illuminator 14.

The brightness or spectral power of a typical pixel of the lower band (image 46) may be 55 and the brightness or spectral power of the corresponding typical pixel of the upper band (image 47) may be 10. These upper and lower band pixel values are representative of skin in the corresponding bands. The spectral power of a resulting typical fused pixel, in daytime viewing, at a location of row i and column j in the daytime is determined with the following calculation.

$$P(i,j)_{fused} = 55 - 3*10$$

$$P(i,j)_{fused} = 55 - 30 = 25$$

The fused pixel signals go from software process or specialized hardware 17 to software process or specialized hardware 18 for image segmentation via thresholding of the fused pixels. Process or specialized hardware 18 emulates a comparator-like circuit in that each fused pixel below a certain threshold value (T) is assigned a value ($V_1$) of 0 and each fused pixel above the certain threshold value is assigned a value ($V_2$) of 255.

Figure 3:
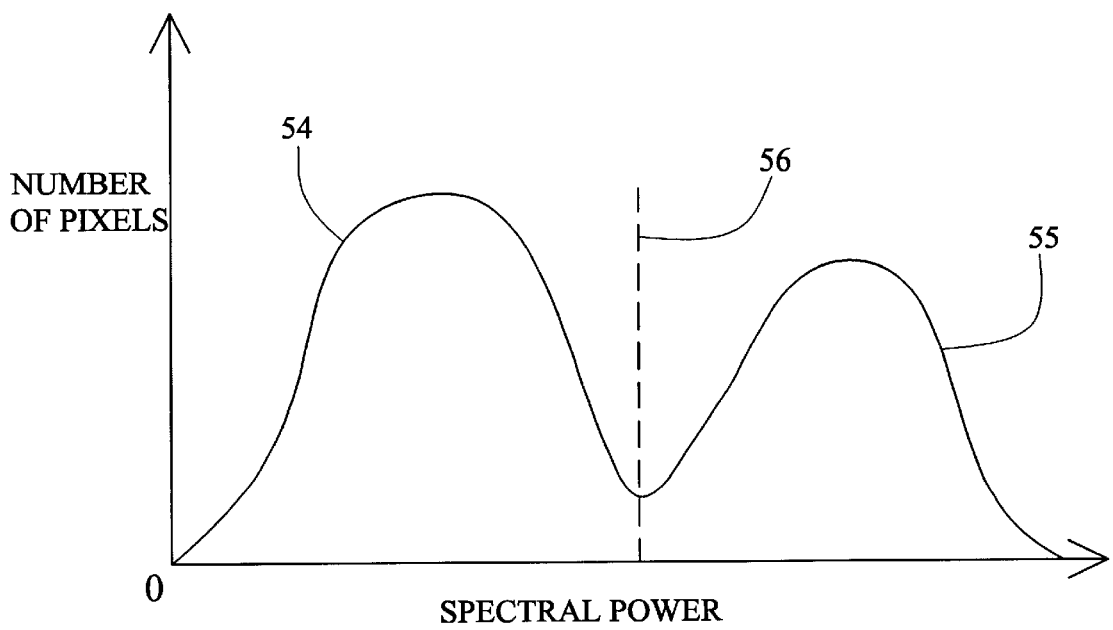
FIG. 3 is a histogram of the number of pixels versus spectral power for an image frame.

FIG. 3 shows a histogram of an image frame of fused pixels. The number of pixels for each spectral power value is indicated by curves 54 and 55 for a given sensed image. The pixels of curve 54 represent background 20 and the pixels of curve 55 represent human skin 13. Curves 54 and 55 intersect at 56 that is deemed to be the appropriate value for thresholding. If curves 54 and 55 do not intersect, then the thresholding value 56 is centered between curves 54 and 55. The threshold value is dynamic in that it changes from frame to frame, and is determined for each image frame according to the histogram of the respective frame. If the spectral value for thresholding is 20, then fused pixels having a value below 20 are valued at 0 and fused pixels having a value above 20 are valued at 255. The resulting image in display 19 has white pixels for background 20' and black pixels for face 13'. This image may be reversed by process or specialized hardware 18 such that background 20' has black pixels and face 13' has white pixels.

As one can note here, a main application of the invention is people detection in vehicles. However, people detection can be used at security points, alert areas, and so forth. An enhanced version of system 10 may be used to actually identify people.

The spectrums that cameras 11 and 12 function are within the reflected infrared portion 21 in FIG. 4, which shows the EM spectrum. Visible spectrum 22 is the spectral sensitivity of conventional cameras. Unfortunately, visible light cameras have noise levels that increase during poor environmental conditions such as bad weather, nighttime, and direct sunlight. Some problems, such as nighttime viewing may be overcome with artificial lighting, which matches the visible spectrum of the camera, and which in vehicle occupant detection is a serious distraction to drivers. Another disadvantage is that a human face 13, which is the object of interest, does not have consistent qualities within the visible range. Vehicle occupant faces appear dark or light, depending o n the physiological characteristics of the occupant, and the intensity and incident angle of illumination.

The thermal infrared band 23 (3.0 to 5.0 and 8.0 to 14 microns) is associated with thermal properties of materials. The human body is at a temperature of 37 degrees C. This means that human faces have a consistent light color in thermal infrared imaging, despite various facial colors, which is contrary to visible imaging.

The thermal property of the body provides a clear differentiator from look-alike dummies. The thermal infrared sensor can function at night without an external illuminator. One disadvantage of using the thermal infrared band 23 for occupant detection is that vehicle windshield glass greatly attenuates infrared light transmission at 2.8 microns and higher.

Figure 6:
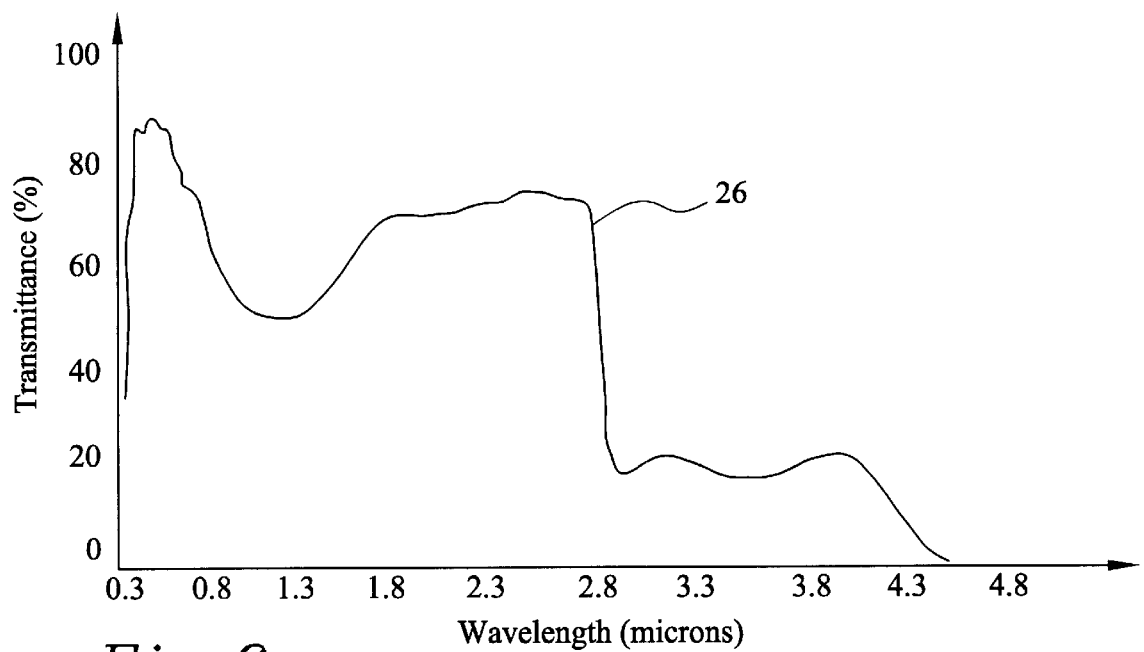
FIG. 6 reveals the infrared transmittance characteristics for an automobile side window.

FIG. 5 reveals the transmittance characteristics of infrared light between 0.4 and 2.8 microns for a clean vehicle windshield (curve 24) and a dirty windshield (curve 25). Beyond 2.8 microns of thermal infrared bandwidth 23, the radiation transmittance characteristic of windshield glass is almost zero. The transmittance of a lightly tinted side window of a vehicle is good (50 to 85%), from 0.3 up to 2.8 microns as reveal ed by curve 26 in FIG. 6. Between 2.8 and 4.3 microns, the radiation transmittance is about 20 percent for the side vehicle window. Beyond 4.3 microns the transmittance drops to nearly zero. However, the spectral behavior of the side window permits transmittance of some thermal radiation.

Figure 7:
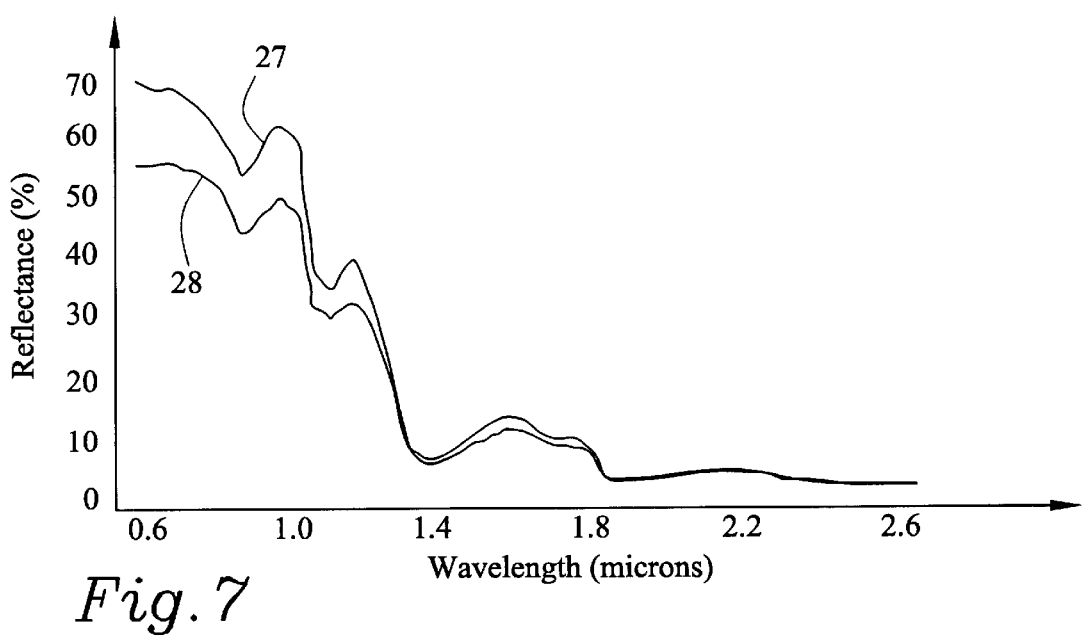
FIG. 7 is a graph showing the percentage of reflectance for Caucasian males of light and dark complexions.

Curves 27 and 28 of FIG. 7 show the percentage of reflectance of infrared light for light and dark complexion Caucasian males, respectively. The reflectance is good between 0.6 and 1.4 microns. Above 1.4 microns, the reflectance is significantly diminished. However, the difference of reflectances of light and dark complexions are minimal.

Figure 8:
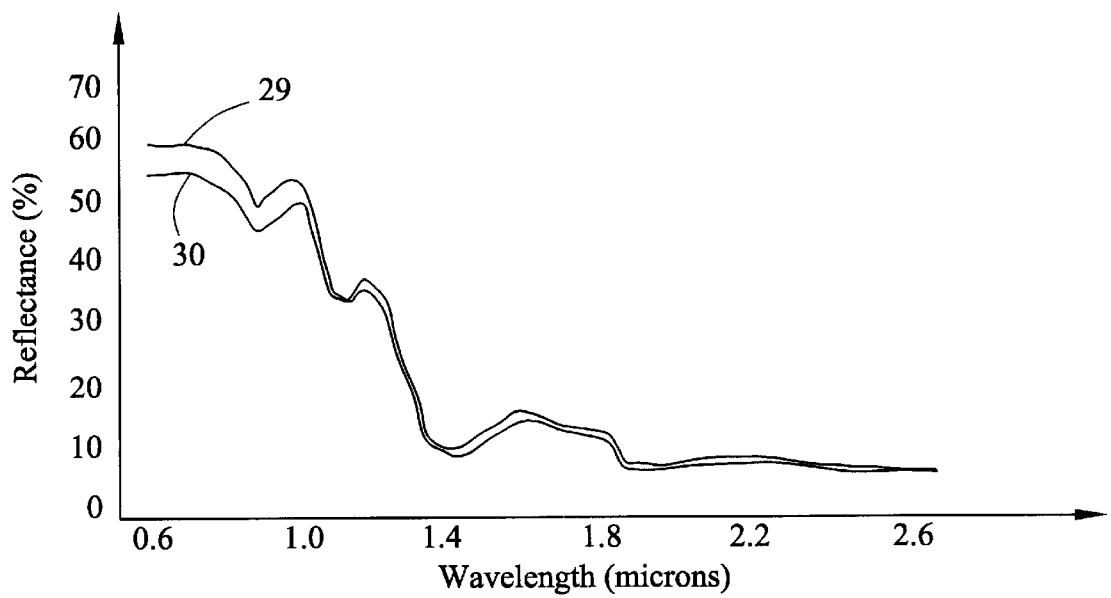
FIG. 8 is a graph showing the percentage of reflectance for Asian males of light and dark complexions.
Figure 9:
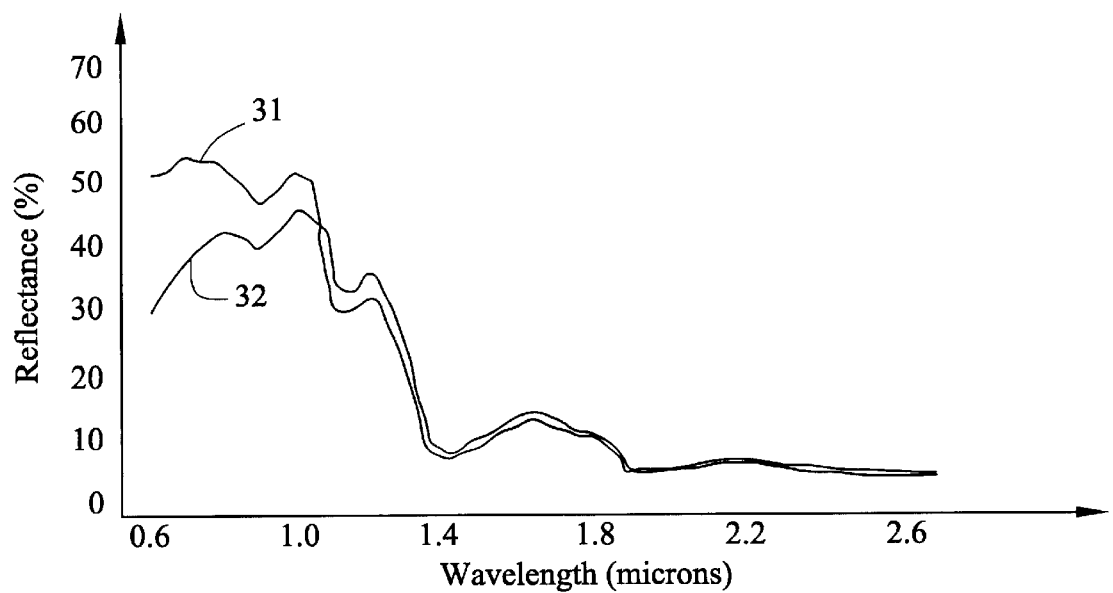
FIG. 9 is a graph showing the percentage of reflectance for black males of light and dark complexions.

In FIG. 8, curves 29 and 30 show skin reflectances for light and dark complexions, respectively, of Asian males. Curves 31 and 32 of FIG. 9 show skin reflectances for light and dark complexions of black males. Even though the reflectances of light complexions are higher than those of dark complexions; curves 27, 28, 29, 30, 31 and 32 of FIGS. 7–9, respectively, have similar shapes and all of them drop off at about 1.4 microns. These reflectances show some variation for all complexions of the Caucasian, Asian, and black males, between 0.6 and 1.4 microns.

Figure 10:
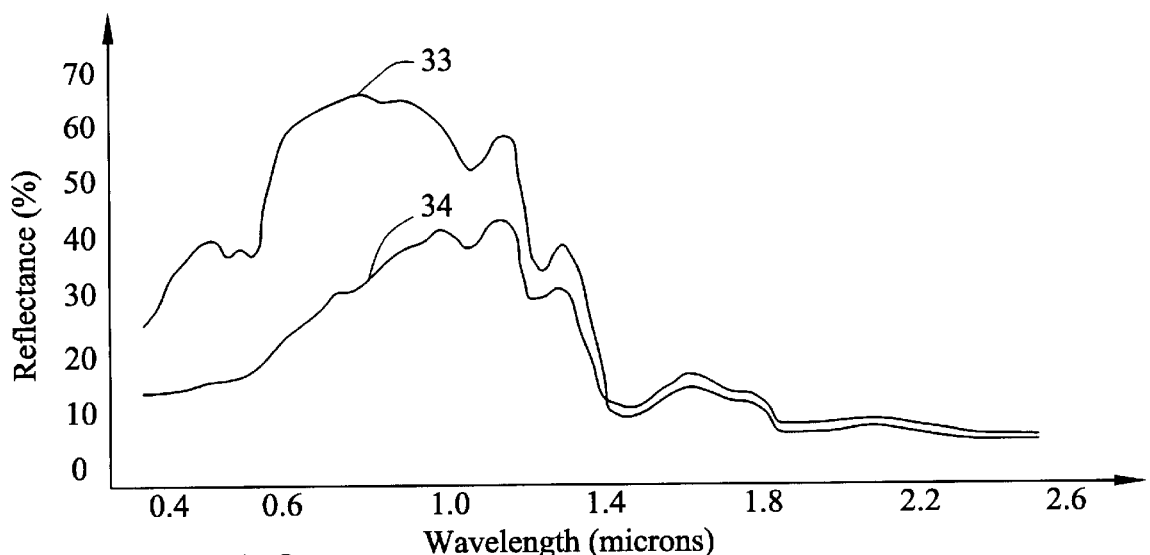
FIG. 10 is a graph showing a comparison of reflectances for light and dark skin.

Curves 33 and 34 of FIG. 10 show the reflectances for more extreme differences of light skin and dark skin, respectively. The reflectances of light skin and dark skin are significant up to 1.4 microns. After 1.4 microns, reflectance curves 33 and 34 for light and dark skin, respectively, become almost coincident and the resultant reflectances drop below 20 percent. Thus, in the near-infrared bands of 1.4 and above, the reflectance of detected humans of all kinds of skin shade, are about the same at wavelengths greater than 1.4 microns.

Figure 11:
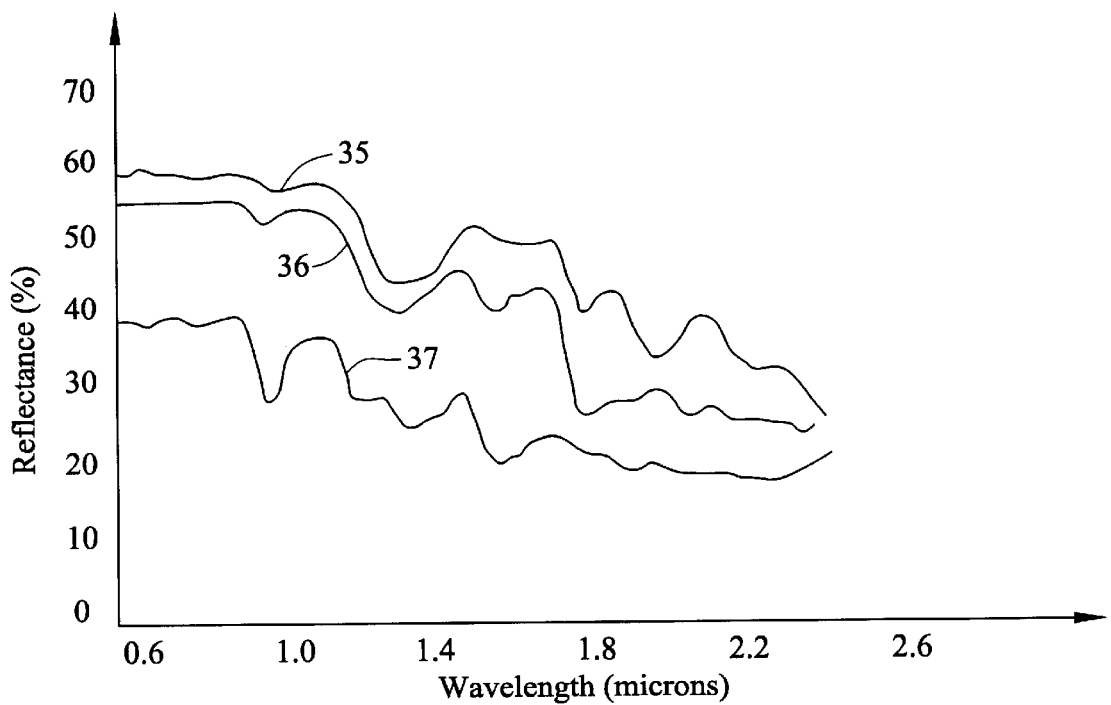
FIG. 11 is a graph of reflectances for cotton, wood and polyamide.

In FIG. 11, curves 35, 36, and 37 show the reflectance for cotton, wood, and polyamide respectively, to be significant not just between 0.6 and 1.4 microns, but beyond 1.4 microns. The insignificant drop in reflectance after the 1.4 micron threshold point, is a basis that shows a large contrast in reflectance between the human face and inanimate objects, such as upholstery, the dashboard, and fabrics in a vehicle, which are background, and provide for easy detection of the human face in the range of 1.4 to 2.2 microns.

Consequently, there is a significant contrast, in reflectance between the images of a Caucasian male and a dummy head from a camera operating in the range between 1.4 and 2.2 microns. The image of the dummy is reflective and appears rather bright and the male human image is dark and thus the resultant contrast between the two images is rather stark. This person detection scheme is much superior to visible light imaging, since the latter scheme reveals little or no contrast between the Caucasian and dummy heads of like colors. In summary, it is easy to distinguish images of the human head from those of the dummy head in the 1.4 to 2.2 micron range imagery, but not easy to distinguish the images of the respective heads from each other in the 0.8 to 1.4 micron range imagery.

Figure 12:
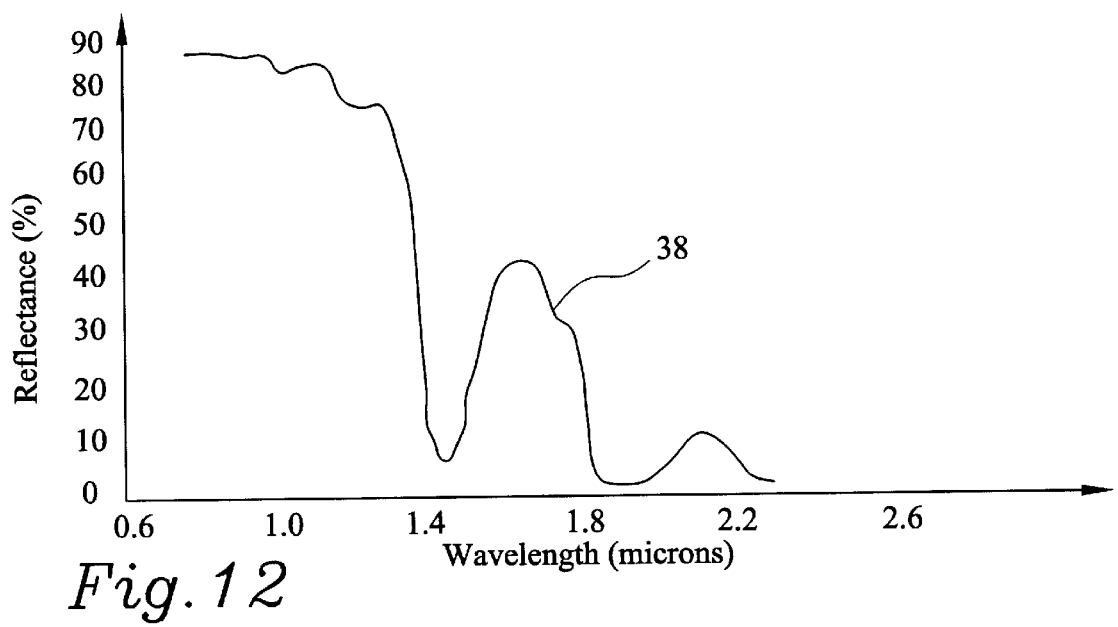
FIG. 12 is a graph of reflectance for distilled water.

The lower reflectivity of human skin for the 1.4 to 2.2 micron spectral range is explained by the spectral reflectance of distilled water as shown by curve 38 of FIG. 12. There is a substantial drop in reflectance at about 1.4 microns. Beyond 1.4 microns, the water absorbs substantial infrared radiation and appears in an image as a dark body. Since the composition of the human body consists of 70 percent water naturally, its spectral response is similar to that of water. So camera 12, operating in the 1.4 to 2.2 micron range, captures this unique human body differentiator. With the operating range of camera 12, one can safely use during nighttime a matching near-infrared illumination source 14 to improve the quality of the sensed image of face 13. This light is invisible to humans, such as vehicle drivers, but also is rmless to their eyes since the wavelength of illuminator 14 is above the safe threshold of 1.4 microns.

Also, since cameras 11 and 12 of system 10 operate at a lower band than the mid-infrared band, glass penetration is not a problem and cameras 11 and 12 can easily detect through the frontal windshield of a vehicle. Thus, speed requirements for cameras 11 and 12 are less restrictive. In an actual highway site, a zoom lens would be used.

Figure 13:
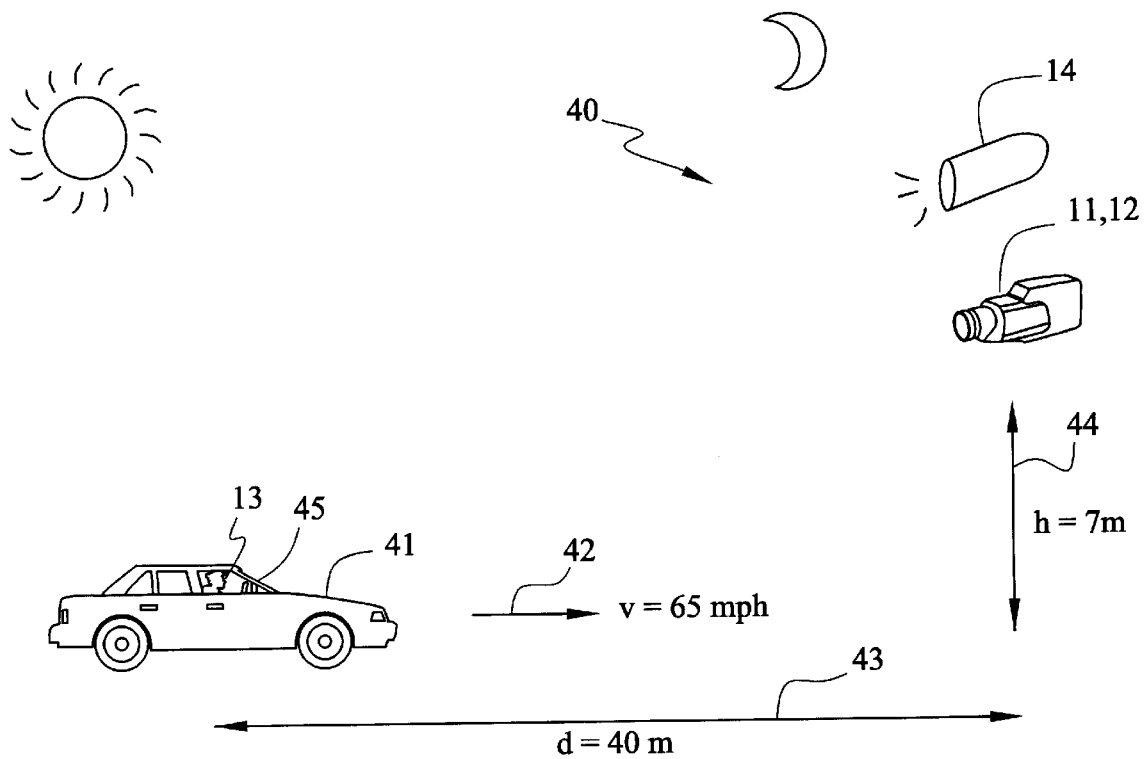
FIG. 13 shows a layout for determining the speed characteristics of a human detection system.

FIG. 13 shows a layout of a near-infrared system 40 for determining the speed characteristics of the human detector. A vehicle 41 may be assumed to be moving down a highway at a velocity v, as shown by vector 42, and be observed in a frontal view with a near-infrared camera 11 or 12 at a distance d, as shown by line 43, and from a height h, as shown by line 44. Only one of the cameras 11 and 12 is needed for this evaluation, but it may be either one of them. Camera 11, 12 may be a Sensors Unlimited Inc. SU 320 equipped with a telephoto lens, a band-pass filter in the range 1.4 to x microns (where x>1.4 microns), and a polarizing filter to reduce the glare effect from the sun illumination during daytime.

During the daytime, system 40 uses the illumination of the sun. The objective is to determine if there is any appropriate geometric arrangement for camera 11, 12 so that the signal to noise (S/N) ratio and the camera speed are kept at acceptable levels even under adverse conditions. An acceptable (S/N) ratio is considered anything above 35. The speed quality is considered acceptable when the image smearing does not exceed the width of one pixel.

The first step in a radiometric computation is to determine the amount of radiation that falls upon the objects of interest such as the occupants of vehicle 41. The spectral band considered is above the 1.4-micron threshold point. Because of constraints due to the quantum efficiency of the camera SU-320 that was used in the actual experiments, one limits the spectral band in the range of 1.4 to 1.7 microns. Slightly modified things are in effect for the extended range of 1.4 to 2.2 microns. The spectral irradiance of the sun (the illumination source) on a clear day at sea level is approximately $I_{sunny}$=0.008 Watts/cm$^2$ in the 1.4 to 1.7 micron band range. In this computation, however, one considers the worst case scenario of an overcast day. For an overcast day, the irradiance value is reduced by $10^{-3}$ thus giving irradiance at vehicle 41 of approximately $$I_{overcast} = 10^{-3} * I_{sunny}$$
$$= 10^{-3} * 0.008$$
$$= 8 \ \mu Watts/cm^2.$$

The transmittance in this spectral range of windshield 45 of vehicle 41 is approximately 0.4 resulting in an irradiance on the vehicle occupants of $$I_{occupant} = 0.4 * I_{overcast}$$
$$= 0.4 * 8$$
$$= 3.2 \ \mu Watts/cm^2.$$

The second step in a radiometric computation is to determine how much of the incident radiation on the objects of interest is reflected back to the sensor (i.e., near-infrared camera 11, 12). The radiance into a hemisphere assuming a reradiate of 0.4 would be $$R_{occupant} = 0.4 * I_{occupant}/\pi$$
$$= 0.4 * 3.2/\pi$$
$$= 0.4 \ \mu\text{Watts/cm}^2 - \text{steradian}.$$

This represents the reflected portion of the occupant irradiation. The occupant's body absorbs the rest. The reflected radiation has to pass through windshield 45 and the camera 11, 12 lens to reach the near-infrared sensor array of camera 11, 12. One assumes a 0.4 windshield transmittance, a f/2 camera lens (i.e., having a 14.32° cone angle) with 0.8 transmittance, a polarizer with 0.4 transmittance, and a band-pass filter with 0.6 transmittance. Then, the irradiance at the sensor array of camera 11, 12 will be $$I_{camera} = 0.4 * 0.8 * 0.4 * 0.6 * \pi * R_{occupant} * \sin^2(14.32°)$$
$$= 0.4 * 0.8 * 0.4 * 0.6 * \pi * 0.4 * \sin^2(14.32°)$$
$$= 0.006 \ \mu\text{Watts/cm}^2.$$

Camera 11, 12 has square pixels with a side of $37.5*10^{-4}$ cm or an area $$A = 37.5 * 10^{-4} * 37.5 * 10^{-4}$$
$$= 1.40 * 10^{-5} \text{ cm}^2.$$

Consequently, the radiant power on the camera 11, 12 pixel will be $$P_{pixel} = A * I_{camera}$$
$$= 1.4 * 10^{-5} * 0.006$$
$$= 0.084 * 10^{-12} \text{ Watts}.$$

The camera's detectivity D* is $D^*=10^{12}$ cm $\sqrt{\text{Hz}}$/Watts. The noise equivalent power (NEP) is related to detectivity D*, pixel area A, and electronic bandwidth $\Delta f$ by the following equation $$NEP=(A/\Delta f)^{1/2}/D^*.$$

The bandwidth $\Delta f$ is determined by the exposure time of camera 11, 12. The exposure time depends on vehicle 41 velocity 42, camera range 40, and the camera 11, 12 field of view such that the images smear less than 1 pixel. Assuming vehicle 41 traveling at a speed of 65 mph, at a distance d 43 of 40 meters (m) away from camera 11, 12, and with a field of view of 1.6 m, the 320×240 pixel array of camera 11, 12 gives a maximum exposure time of 1 ms or a bandwidth of $\Delta f=1$ kHz. Substituting the values for A, $\Delta f$, and D* in the formula of NEP, one gets $$NEP=1.18*10^{-13} \text{ Watts}.$$

Therefore, the signal to noise ratio S/N will be $$S/N=(P_{pixel}/NEP)=0.7.$$

In conclusion, assuming a worst case scenario (overcast day, dirty windshield, dark occupant skin) one determines that camera 11, 12, equipped with a f/2 lens, a 1.4 to 1.7 $\mu$m filter, and a polarizer, if it is positioned at a distance 43 of d=40 m from incoming car 41 and at a height 44 of h=7 m at the specified distance 43, will achieve an acceptable smear of less than one pixel because the required exposure time of 1 ms is within the camera's speed capabilities. The signal to noise ratio (S/N) is 0.7. To boost the S/N ratio to a higher value on overcast days, one needs to employ an illumination source 14. Illumination source 14 will also be helpful during nighttime. If one operated in the visible spectrum, the use of an illuminator in the high occupancy vehicle (HOV) lane would be prohibitive. Fortunately, in this case, the spectral signature of illuminator 14 for the 1.4 to 1.7 micron waveband can be safely employed in the HOV lane.

Post processing includes a neural network that performs automatic vehicle occupant detection. The vehicle occupant detection approach is based upon a fuzzy neural network algorithm. The perfect binary image provided by the fusion approach described above facilitates high correct detection rates.

What is claimed is:

1. A human detector for use in detecting a human in a scene, the detector comprising:
    a first camera sensitive to a first band of wavelengths within a reflected infrared radiation range and operable to provide a first image output representative of the scene;
    a second camera sensitive to a second band of wavelengths within the reflected infrared radiation range and operable to provide a second image output representative of the scene;
    a fuser connected to said first and second cameras operable on the first image output and the second image output to provide a fused image output having an increased contrast between a human and a background in the scene;
    a thresholder connected to said fuser operable on the fused image output for use in segmenting a detected human from the scene, the thresholder providing a thresholded output; and
    an image indicator connected to said thresholder and operable on the thresholded output to detect a human in the scene.

2. The detector of claim 1, wherein said first and second cameras have the same fields-of-view.

3. The detector of claim 2, wherein:
    said first camera has its field of view focused on a first sensing array; and
    said second camera has its field of view focused on a second sensing array.

4. The detector of claim 3, wherein:
    the first sensing array comprises m×n pixels;
    the second sensing array comprises m×n pixels;
    each pixel of said first sensing array is designated as $(i,j)_1$, where i ranges from 1 to m and j ranges from 1 to n; and
    each pixel of said second sensing array is designated as $(i,j)_2$, where i ranges from 1 to m and j ranges from 1 to n.

5. The detector of claim 4, wherein:
    a spectral power of a pixel from the first sensing array is designated as $P(i,j)_1$; and
    a spectral power of a pixel from the second sensing array is designated as $P(i,j)_2$.

6. The detector of claim 5, wherein:
    said fuser fuses the spectral power $P(i,j)_1$ of each pixel of the first sensing array with the spectral power $P(i,j)_2$ of each corresponding pixel of the second sensing array; and an output of said fuser is a spectral power of each fused pixel $P(i,j)_f$ that is a fusion of the spectral powers $P(i,j)_1$ and $P(i,j)_2$.

7. The detector of claim 6, wherein:

$P(i,j)_f = P(i,j)_1 - C*P(i,j)_2$; and

C is a constant.

8. The detector of claim 7, wherein said thresholder processes the spectral power $P(i,j)_f$ of each fused pixel into a spectral power $P(i,j)_t$ of a threshold pixel.

9. The detector of claim 8, wherein:

$P(i,j)_t$ is equal to a first value or a second value;

the first value is a minimum spectral power; and the second value is a maximum spectral power.

10. The detector of claim 9, wherein:

$P(i,j)_t$ is equal to the first value if $P(i,j)_f$ is below a threshold value; and $P(i,j)_t$ is equal to the second value if $P(i,j)_f$ is above the threshold value.

11. The detector of claim 10, wherein a wavelength between the first and second bands of wavelengths is about 1.4 microns.

12. The detector of claim 11, wherein:

a histogram reveals a numerical distribution of pixels over a range of spectral powers $P(i,j)_f$ for each frame; and the threshold value is a spectral power selected between two most populous distributions of pixels on the histogram.

13. The detector of claim 12, wherein C is selected according to lighting conditions of a scene within the fields-of-view.

14. The detector of claim 13, further comprising an image indicator connected to said thresholder.

15. The detector of claim 14, wherein:

the first band of wavelengths is between about 0.8 and 1.4 microns; and the second band of wavelengths is between about 1.4 microns and 2.2 microns.

16. A human detector comprising:

first camera means for sensing radiation of a scene within a first band of wavelengths in a reflected infrared radiation range;

second camera means for sensing radiation of the scene within a second band of wavelengths in the reflected infrared radiation range;

fusing means connected to said first and second camera means for fusing spectral powers $P(i,j)_1$ of pixels $(i,j)_1$ from said first camera means with spectral powers $P(i,j)_2$ of corresponding pixels $(i,j)_2$ from said second camera means, resulting in fused spectral powers $P(i,j)_f$; and thresholding means, connected to said fusing means, for thresholding fused spectral powers $P(i,j)_f$ from said fusing means, resulting in threshold spectral powers $P(i,j)_t$; and wherein:

the scene is focused by said first camera means on a first sensing array having m×n pixels;

the scene is focused by said second camera means on a second sensing array having m×n pixels;

each pixel is located at ith row and jth column;

$0 < i \leq m$; and $0 < j \leq n$.

17. The detector of claim 16, further comprising indicating means for displaying a segmented image of the scene.

18. The detector of claim 16, wherein:

$P(i,j)_f = P(i,j)_1 - C*P(i,j)_2$; and

C is a constant determined according to a lighting condition of the scene.

19. The detector of claim 18, wherein:

$P(i,j)_t = V_1$ if $P(i,j)_f > T$;

$P(i,j)_t = V_2$ if $P(i,j)_f < T$;

$V_1$ is a first value;

$V_2$ is a second value, and

T is a threshold value.

20. The detector of claim 19, wherein T is determined by a spectral power distribution of fused pixels $(i,j)_f$.

21. The detector of claim 20, wherein a wavelength between the first and second bands of wavelengths is about 1.4 microns.

22. The detector of claim 21, wherein:

the first band of wavelengths is between about 0.8 and 1.4 microns; and the second band of wavelengths is between about 1.4 microns and 2.2 microns.

23. A method for detecting humans, comprising:

focusing a scene on a first m×n pixel array that is sensitive to light of a first bandwidth within a reflected infrared radiation range;

focusing the scene on a second m×n pixel array that is sensitive to light of a second bandwidth within the reflected infrared radiation range;

fusing a spectral power $P(i,j)_1$ of each pixel of the first m×n pixel array with a spectral power $P(i,j)_2$ of each corresponding pixel of the second m×n pixel array, to result in a spectral power $P(i,j)_f$ of a fused pixel, respectively;

thresholding the spectral power $P(i,j)_f$ of each fused pixel into a first value if the spectral power is greater than a threshold value; and;

thresholding the spectral power $P(i,j)_f$ of each fused pixel into a second value if the spectral power is less than the threshold value;

wherein:

$0 < i \leq m$; and $0 < j \leq n$.

24. The method of claim 23, wherein:

$P(i,j)_f = P(i,j)_1 - C*P(i,j)_2$; and

C is a constant dependent upon a lighting condition of the scene.

25. The method of claim 24, wherein:

$P(i,j)_t = V_1$ if $P(i,j)_f > T$;

$P(i,j)_t = V_2$ if $P(i,j)_f < T$;

$V_1$ is a first value;

$V_2$ is a second value; and

T is a threshold value dependent upon a distribution of spectral powers $P(i,j)_f$ of the fused pixels.

26. The method of claim 25, wherein a wavelength between the first and second bandwidths is about 1.4 microns.

27. The method of claim 26, further comprising displaying a segmented image with the first and second values of the threshold pixels $(i,j)_t$.

28. The method of claim 27, wherein:

the first bandwidth is between about 0.8 and 1.4 microns; and the second bandwidth is between about 1.4 microns and 2.2 microns.

29. A method for detecting humans in a scene, the method comprising:

focusing a scene on a first m×n pixel array that is sensitive to light of a first bandwidth within a reflected infrared radiation range to provide a first image output representative of the scene;

focusing the scene on a second m×n pixel array that is sensitive to light of a second bandwidth within the reflected infrared radiation range to provide a second image output representative of the scene; and using the first and second image outputs to detect a human in the scene.

30. The method of claim 29, wherein using the first and second image outputs to detect a human in the scene comprises fusing spectral power of the pixels of the first image output with spectral power of corresponding pixels of the second image output to provide a fused image output having an increased contrast between a human and a background in the scene.

31. The method of claim 30, wherein using the first and second image outputs to detect a human in the scene further comprises segmenting the human from the scene by comparing the spectral power of each pixel of the fused image output to one or more threshold values.

32. The method of claim 31, wherein the method further comprises displaying a segmented image.

33. The method of claim 29, wherein a wavelength between the first and second bandwidths is about 1.4 microns.

34. The method of claim 29, wherein the first bandwidth is between about 0.8 and 1.4 microns and the second bandwidth is between about 1.4 microns and 2.2 microns.

35. The method of claim 29, wherein a difference in reflectance for human skin in the first bandwidth relative to the second bandwidth is greater than a difference in reflectance for objects other than human skin in the first bandwidth relative to the second bandwidth.

36. The method of claim 35, wherein using the first and second image outputs to detect a human in the scene comprises performing a weighted difference calculation of spectral power of the pixels of the first image output with spectral power of corresponding pixels of the second image output resulting in a weighted difference output for the pixels.

37. The method of claim 36, wherein using the first and second image outputs to detect a human in the scene further comprises comparing the weighted difference output for the pixels to one or more threshold values to differentiate pixels representative of human skin from pixels representative of objects other than human skin.

* * * * *